Feb. 2, 1971 — R. W. HELLING — 3,560,287
METHOD AND APPARATUS FOR PROTECTING INSULATED PIPE
Filed April 27, 1967 — 2 Sheets-Sheet 1
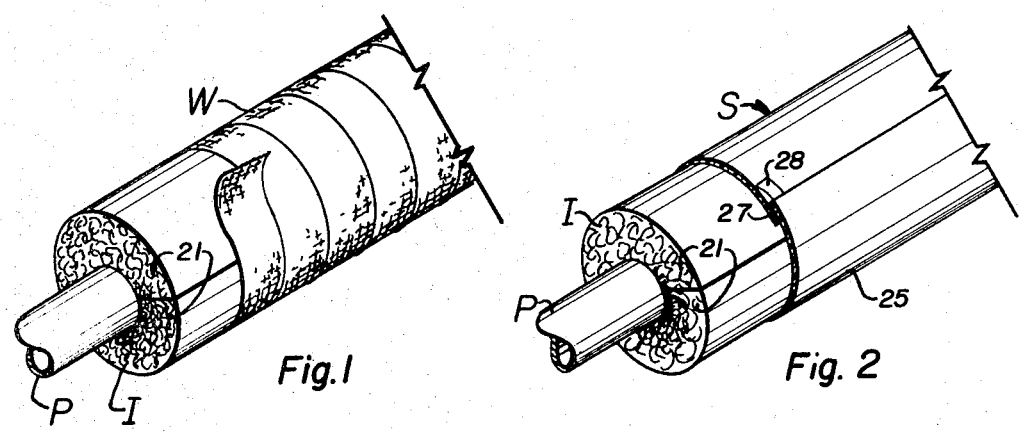
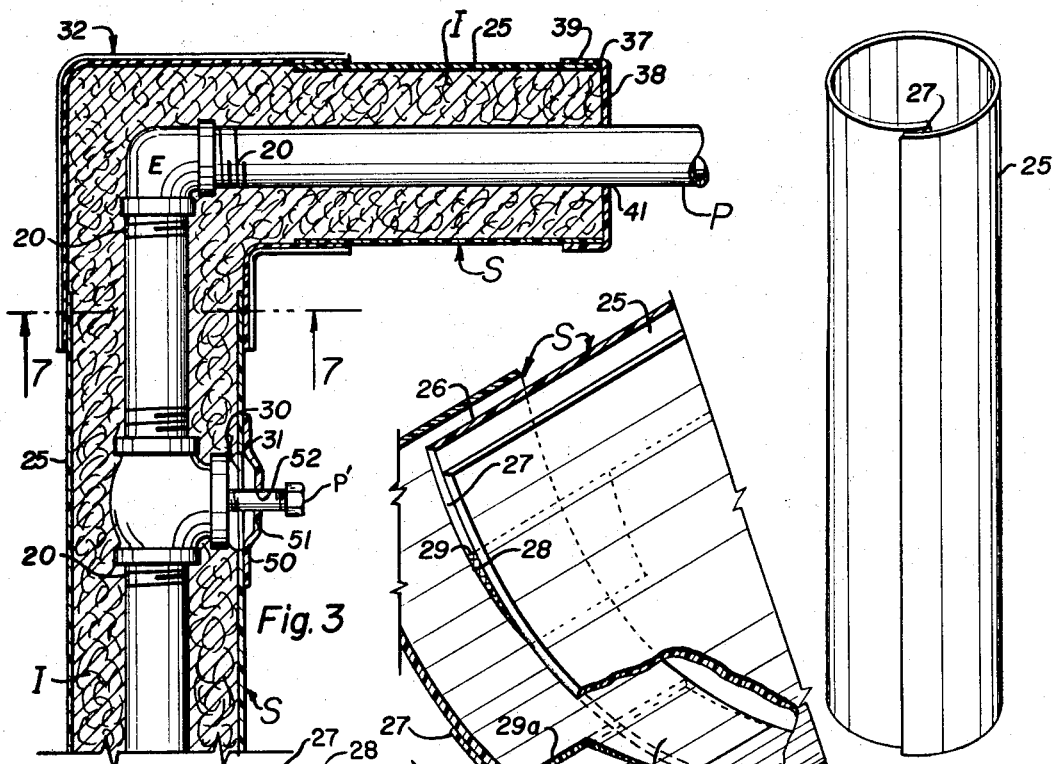
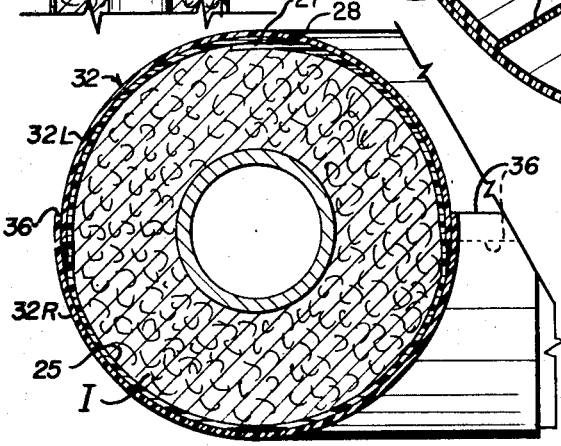
INVENTOR.
Robert W. Helling
BY
ATTORNEYS Feb. 2, 1971  R. W. HELLING  3,560,287
METHOD AND APPARATUS FOR PROTECTING INSULATED PIPE
Filed April 27, 1967  2 Sheets-Sheet 2
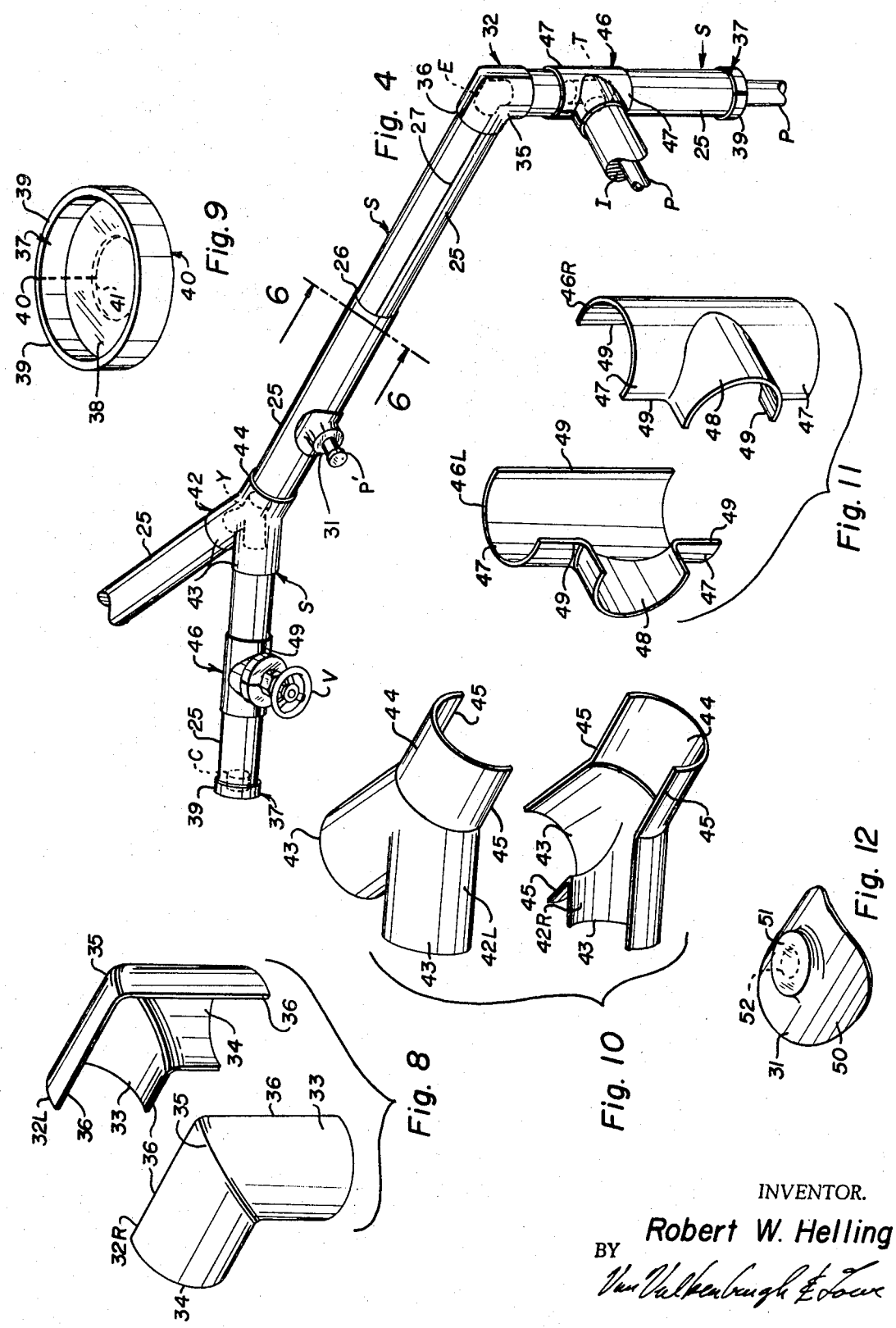
INVENTOR.
Robert W. Helling
BY
ATTORNEYS

United States Patent Office 3,560,287
Patented Feb. 2, 1971

3,560,287
METHOD AND APPARATUS FOR PROTECTING INSULATED PIPE
Robert W. Helling, Greeley, Colo., assignor to Lundvall and Associates, Greeley, Colo., a partnership
Filed Apr. 27, 1967, Ser. No. 634,347
Int. Cl. B29d 23/10
U.S. Cl. 156—218                                    7 Claims

ABSTRACT OF THE DISCLOSURE

A method for ensheating an insulated pipe with a rectangular smooth-surfaced, resin sheet having the characteristics of high-impact polystyrene with a thickness in the range of 0.030 to 0.060 inch by welding the overlapping edges with a fluid cement having therein a solvent of the resin. The sheet is permanently curled to a radius which will snugly embrace a range of sizes of pipe insulation and wrapped about the pipe so as to lap the longitudinal edges of the sheet as the wrap is completed.

---

This invention relates to improvements in protecting the surfaces of pipe, and more particularly, to methods and apparatus for protecting the surfaces of insulated pipe. As such, a primary object of the invention is to provide a novel and improved method and apparatus for protecting the surfaces of insulated pipe from deleterious substances which are deposited onto the insulation by vapors, aerosols; spattering and sprays to which the pipe is exposed.

The invention was conceived and developed to better solve a difficult and serious problem which exists in an environment such as that found in meat packing plants. Strict governmental regulations require a meat packing plant to be kept clean and sanitary. Accordingly, there is provided a supply of steam, hot water and cold water to wash carcasses and the offal, to clean the floors, tables and walls of the plant from manure, blood, hair and other substances which spatter about during the slaughtering and packing operations. A clean-up is necessarily a frequent, daily and repeated operation to maintain the degree of sanitation desired in food processing operations.

In the usual procedure, such a clean-up is completed by washing the walls, equipment and floors of the plant with a jet of hot steaming water which may have cleaning compounds added to it. Although very effective in cleaning the walls and floor of the plant, the vapors from the hot water will actually carry minute particles of fat, organic acids and similar substances which will be deposited upon the walls, windows and on the various surfaces of other objects in the plant, including the piping system, and such deposits must be removed from time to time as whenever the amounts thereon become noticeable. The walls and other objects, usually of solid materials, do not present any problems in the cleaning operations, but the situation is otherwise with the insulated piping system. The insulated pipes, especially the hot water pipes, provide a perfect temperature environment for the growth of fungii and bacteria, and even minute amounts of fat or other organic deposits on the pipes can support such growths. This, and other factors, bring about a difficult problem in keeping the piping system of the packing plant clean, neat and sanitary. Not only are the insulated pipes hard to clean and provide ideal surfaces to support the growth of fungii and bacteria, but also, the fabric of the wrappings covering the insulation, even when painted, are capable of supporting the growth of fungii and bacteria without other organic deposits, upon them. This is evidenced by discoloration and rapid rotting of the wrappings and exposure of the pipe insulation at many plant locations. Attempts to remedy these conditions with metal coverings have proven to be unsatisfactory.

Additional problems arise whenever the insulation becomes exposed. Cork, or other organic types of insulation, will immediately commence to rot. On the other hand, inorganic types of insulation such as rock wool, asbestos or synthetic resin foam, present highly porous surfaces which will receive organic deposits, such as fats and acids in vapor and steam, and it is apparent that such surfaces cannot be cleaned with a steam jet or in any other manner, without destroying the insulation itself. Even if no attempts were made to clean the insulation, an accumulation would ultimately cause it to lose its insulating value.

The present invention proposes to ensheath, and to a substantial degree, hermetically seal the insulated piping system of a plant such as a meat packing plant, within a smooth-surfaced skin of a selected type of synthetic resin which is characterized by toughness, resistance to water, resistance to heat such as that which would be encountered in a steam line, resistance to acid and alkali and totally incapable of supporting or being rendered permeable to organic growth.

It follows that another object of the invention is to provide a novel and improved mode of protectively ensheathing an insulated piping system within a material having an impermeable smooth-surface skin capable of presenting a neat and attractive appearance and of being easily washed and cleaned.

Another object of the invention is to provide a novel and improved mode of protectively ensheating an insulated pipe within a material which is sufficiently tough as to withstand the ordinary physical abuse to which pipe insulation is apt to be subjected.

Another object of the invention is to provide a novel and improved mode of protectively ensheathing an insulated pipe with an impermeable material which is resistant to hot water and steam so that the insulated pipe may be quickly and easily washed with a steam jet in the same manner as the floors and walls of the plant are washed, all without any danger of destroying or impairing the effectiveness of the insulation within the sheath.

Another object of the invention is to provide a novel and improved mode of protectively ensheathing an insulated pipe to render the surface thereof resistant to acids, alkalis and incapable of supporting or retaining an organic growth.

Still other objects of the invention are to provide a novel and improved mode of protectively ensheathing an insulated pipe, which involves the use of easily obtained, economical materials, which may be provided as simplified prefabricated components capable of being quickly and effectively installed upon an existing system of insulated piping, and when once installed, will also greatly prolong the effective life of the insulated pipe system.

With the foregoing and other objects in view, all of which more fully hereinafter appear, my invention comprises certain steps and sequences, and operations, constructions, combinations and arrangements of parts and elements as hereinafter described, defined in the appended claims and illustrated in a preferred embodiment in the accompanying drawing, in which:

FIG. 1 is a diagrammatic, isometric view of an insulated pipe, showing a fragment of the pipe and a short section of insulation thereon, as being partially encased in a wrapped web of cloth, illustrative of a common conventional mode of covering an insulated pipe.

FIG. 2 is a diagrammatic, isometric view similar to FIG. 1, but showing the insulation as being partially encased in a sheath formed according to a preferred construction of the invention.

FIG. 3 is a longitudinal sectional view of an insulated pipe encased within the improved sheath and illustrating more specifically, the manner in which the sheath is formed about a stub, an elbow, and at the end of the insulation.

FIG. 4 is an isometric view of a reach of insulated pipe encased within the improved sheath and illustrating more specifically, various fittings used in forming the sheath at the pipe connections and at a valve.

FIG. 5 is an isometric view of a straight-run section of a sheath member which is ready for application to an insulated pipe as in the manner illustrated at FIG. 2.

FIG. 6 is a fragmentary sectional detail as taken from the indicated line 6—6 at FIG. 2, but on an enlarged scale.

FIG. 7 is a fragmentary sectional detail as taken from the indicated line 7—7 at FIG. 3, but on an enlarged scale.

FIG. 8 is an isometric exploded view of an elbow portion of the sheath.

FIG. 9 is an isometric view of an end cap portion of the sheath.

FIG. 10 is an isometric exploded view of a Y portion of the sheath.

FIG. 11 is an isometric exploded view of a T portion of the sheath.

FIG. 12 is an isometric view of a saddle cover for enclosing an opening in a straight-run portion of the sheath.

Referring more particularly to the drawing, FIGS. 1 to 4 illustrate representative reaches of an insulated pipe P such as would be installed in a meat packing plant or elsewhere. Ordinarily, this pipe would be of black or galvanized iron of various sizes, having threaded ends 20 to receive various conventional fittings such as an elbow, E; T, T; Y, Y; valve, V; and cap, C, all as being interconnected by the straight reaches of pipe P between the fittings to establish its course.

The insulation I upon the pipe may be for insulating either hot or cold fluids such as steam, water or even refrigerant liquids. The insulation may be of any conventional material such as cork or fibre, or it may be of rock wool, asbestos, diatomaceous earth, or of an expanded, rigid foam of synthetic resin. Where the fluid protected is hot, the insulation may be of any type capable of withstanding the heat. Where the fluid is cold, such as a refrigerant liquid, the insulation should be of a vapor-proof type to resist condensation. Ordinarily, the insulation I is comparatively thick and may be as thick or thicker than the pipe diameter. It is usually standardized in size and the portions which overlie the pipe P are rigid or semi-rigid half sections 21. Special portions of the insulation, not specifically shown, are also standaridized in form and are adapted to fit about elbows, T's and Y's, all to present the external, overall appearance of a neat and tubular arrangement.

These insulation sections 21 and the special portions over the pipe fittings are usually secured to the pipe by using an adhesive or tape to bind the sections 21 together at their contacting surfaces, and a cover is provided by spiral wrapping with a cloth web W, as in the manner illustrated at FIG. 1. Such a web W is usually prepared with an adhesive of a type which will harden upon setting so that the cloth wrapping will function as a thin protective shell which may be painted or otherwise treated. Such a shell is desirable since the insulation materials forming half-sections 21 are notoriously structurally weak and can be easily damaged as by tearing or crushing.

As hereinbefore mentioned, a common problem in a meat packing plant resides in this cover web rotting by moisture effects, engendered by the growth of fungii and bacteria thereon, with the porous texture of the web functioning to permit an invasion of the fungii and bacteria into it and into the pores of the insulation even when the web is heavily painted. A single crack in the paint, no matter how small, is an adequate opening for bacteria to get inside the web and act thereon. Not only do these conditions create a question as to sanitation, but also, such is a major factor in limiting the effective life of the insulation system in a meat packing plant to about four years.

The improved sheath S is made up of a number of components to form the straight reaches and various fitting covers as hereinafter described. These components are formed of selected synthetic resins extruded as sheets which are curled or vacuum drawn to the desired shapes. The resins have, preferably, a melting or softening point exceeding 300° F. to withstand jets of hot water and steam to which they may be subjected during cleaning operations. Also, the resins must be tough and sufficiently resilient as to resist ordinary impacts and yield against accidental blows or bumps. Further, their characteristics must include the property of being easily and effectively welded or glued with common, safe-to-use types of solvents or adhesives. Further, the resins must be impermeable and incapable of supporting or retaining any growth of fungii or bacteria and with surfaces so smooth as to permit an easy removal of substances, such as fats, which can support the growths.

Two types of synthetic resins effectively meet these requirements, one type being known to the trade as high-impact-polystyrene, and the other being an acrylonitrile-butadiene-styrene. Both of these resins can be extruded to form sheets of any desired thickness, and when in sheet form, both are ideal for shaping by vacuum-draw operations to form the special fittings as hereinafter described. Also, both resins can be easily and effectively welded by a solvent, such as methyl-ethyl-ketone, by wetting and pressing flat surfaces together. Preferably, the methyl-ethyl-ketone is mixed with sufficient resin to form a viscous syrup. Also, when filling is necessary as at double joint laps, a viscous paste or putty may be provided by mixing greater amounts of the resin with the methyl-ethyl-ketone.

A suitable thickness for the sheath S was found to be from approximately 0.030 inch to 0.060 inch, for sheets which were either substantially thinner or thicker than this preferred range of thickness were too difficult to handle, and were otherwise not satisfactory as a final product.

The basic unit of the sheath S is a straight-run section 25 adapted to embrace the straight reaches of the insulated pipe as illustrated at FIGS. 2, 3 and 4. A straight-run section 25, prepared and ready for installation on an insulated pipe, is illustrated at FIG. 5. Insofar as their manufacture is concerned, the straight-run section 25 are of a standardized length when manufactured, and it is contemplated that a reach of pipe may include several of these sections 25 joined together by transverse laps 26, with the end sections being cut as necessary. Each section 25 is a rectangular sheet having a width sufficient to form a complete wrap about the straight reach of an insulated pipe, plus enough to provide a longitudinal lap 27 for welding, as illustrated at FIG. 6. The standardized length of each section is selected as any suitable module, such as three, four, five or six feet, which is easy to handle, store, cut and fit on to straight reaches of insulated pipe. Each straight-run section 25 is desirably a pre-rolled or curled unit, as illustrated at FIG. 5, to facilitate placing it upon the insulated pipe and holding it in position prior to welding the longitudnal seam overlap 27.

The installation of these straight-run sections 25 on an insulated pipe is a simple matter which may be accomplished quickly. Where several sections 25 are required on a straight reach of an insulated pipe, the sections are preferably installed one at a time in a sequence. A first section 25 is placed in position to snugly embrace the pipe, and the longitudinal lap 27 is welded by the resin-solvent mix. Next, as shown at FIG. 6, a tapered wedge 28, formed by an excess of the syrupy resin-solvent mix, or if desired, by a filler paste of the same material applied at the butt 29 of an end of the lap 27 to smooth the surface and eliminate the step formed by the thickness of the lapped material. A second section 25 is then fitted upon the pipe and lapped over the end of the smooth surface portion of the first section, and welded thereto at the lap 26 with a filler paste wedge 28a at the inner lap butt 27a. This process of fitting is continued until the straight reaches of the pipe are covered. At the same time, any necessary openings 30 may be cut in the pipe to permit a stub or the stem of a valve to extend therefrom, as illustrated at FIGS. 3 and 4. Each opening 30 is thereupon capped by a suitable saddle 31, as hereinafter further described.

The fitting of the sheath S over the pipe fittings such as the elbows, T's, Y's, stubs and at the ends of the insulated portions is more complex, and requires specially formed units as now described. Fortunately, the forming of insulation to cover these special sections is standardized to an extent sufficient to permit a standardized arrangement of sheath components to be used in practically every field installation encountered and at a substantial savings in cost. The most commonly used unit is an elbow cover 32. It is formed as two half-sections 32R and 32L as shown at FIG. 8, and is thus divided at the plane of symmetry of the elbow. Each half-section 32R and 32L is similar, and preferably identical in form to the other, the right-left orientation being possibly by rotation of one section with respect to the other. Thus, it is possible to form both from the same mold. The elbow sections are preferably manufactured from sheets of the selected resin by a vacuum-draw process, as into a female mold, with the flash of the draw blank being suitably trimmed from the final form. This is a conventional operation and need not be further described. Each elbow includes a first tube portion 33 and a second tube portion 34 turned 90 degrees from the first and connected by a bend 35. Each elbow will fit upon the elbow section of an insulated pipe and is formed for a direct fit, or a fit with a minimum of alteration to the insulation. The transverse curvature of each half-section exceeds an arc of 180 degrees so that opposing edges 36 will lap each other in a snug, smooth manner for easy welding together as with the selected resin-solvent mix.

An end cap 37 is provided for sealing an end of the sheathed insulated pipe. It is formed as a flat lid 38 having a circular flange 39 adapted to fit upon the end of the sheathed insulated pipe, as in the manner illustrated at FIGS. 3 and 4. While this end cap is formed as a single member, it may be cut at one side, as at 40, to be fitted over a pipe. When fitted over the pipe, the cut may be then butt welded with the resin-solvent mix. A snug fit over the end of a straight section of the sheath is possible, even with variations of diameter of the sheath due to irregularities of the insulation, by using the resin-solvent mix to fill any gaps. As further illustrated in FIG. 9, in broken lines, the center of the lid may be cut as in a circle 41, to provide a hole for a pipe extending from the insulation, as illustrated at FIG. 3.

Y covers 42, as illustrated at FIGS. 4 and 10, form the sheath at Y-branches of the pipe, and each cover is formed as two opposing half-sections 42R and 42L, each being oppositely symmetrical to the other. The sections 42R and 42L may or may not be formed by drawing resin sheets into the same mold cavity, depending upon whether or not the branches 43 are of the same alignment and of the same diameter. However, the transverse curvature of the branch portions 43 and of the base portion 44 of each section, will exceed 180 degrees of arc to permit a snug lapping of the opposing edges 45 when the sections 42R and 42L are properly positioned upon a sheathed pipe system so that the sections may be welded together as heretofore described.

T covers 46, as illustrated at FIGS. 4 and 10, form the sheath at a T-branch of the pipe, and each cover is formed as two opposing sections 46R and 46L, being oppositely symmetrical. The sections 46R and 46L may or may not be formed by drawing resin sheets into the same mold cavity, depending upon whether the arms 47 are of the same diameter. In any event, the transverse curvature of the arm portions 47, and of the leg portion 48 of each section, will exceed 180 degrees to permit a snug lapping of the opposing edges 49 when the sections 46R and 46L are properly positioned upon a sheathed pipe system so that the sections may be welded together as heretofore described.

A saddle 31, as shown at FIG. 12, is adapted to be placed over any opening 30 cut in the wall of a straight-run section 25 of a sheath to permit access to a pipe stub or to a valve handle. This saddle, formed by a vacuum-draw includes an arcuate skirt 50 which lies upon the surface of the wall of a straight sheath section, and a flat lid 51 centered and offset a short distance above the skirt. An opening 52, shown in broken lines, may be cut in this lid to fit over the shank of a valve or over a pipe stub, as desired, and when so positioned, the skirt can be snugly welded to the surfaces of the straight-run section 25.

With the above described components, it is to be noted that the sheath can be quickly assembled over an insulated piping system to produce a leakproof, substantially vapor-proof system. By proper use of a resin-solvent mix to smooth out all lap butts such as 27, and if necessary form wedges such as 28, to fill the gaps which would otherwise exist at the double laps where the several components join each other, a substantially hermetic seal is obtained. This hermetically sealed sheath can, to a substantial extent, protect the insulation of a refrigerant line against condensation effects, as well as against the effects of deleterious vapors. Also, the insulation of a hot water line is protected against the effects of deterioration from any of a number of causes. It is to be noted that the thickness of the resin sheets, from 0.030 to 0.060 inch, will permit some degree of pliability and flexibility of the components as they are being assembled and welded, but at the same time, produce smooth regular laps. The final result will be a slick, smooth-surfaced sheath which is not only easy to keep clean and free of undesirable substances and growths, but which is also very neat in appearance.

The normal indoor life of the resins used herein, is not less than ten years under ordinary conditions, and it follows that the covering and sealing of an insulated piping system, as in a meat packing plant, will generally prolong the life of the insulation from a usual span of four years to a span of at least ten years.

I have now described my invention in considerable detail; however, it is obvious that others skilled in the art can build and devise alternate and equivalent constructions and operations which are within the spirit and scope of the invention, hence, I desire that my protection be limited, not by the constructions illustrated and described, but only by the proper scope of the appended claims.

I claim:

1. A method for ensheathing an insulated pipe with a smooth-surfaced, impermeable sheet of tough, strong, synthetic resin having the characteristics of high-impact polystyrene formed to a thickness in the range of approximately 0.030 to 0.060 inch and prepared as a rectangular member having a length of a selected module and a width exceeding the circumference of the pipe insulation by an amount sufficient to provide for a lap and including the steps of:

curling the sheet to a permanent curl having a radius which will snugly embrace a predetermined range of sizes of pipe insulation with the edges wrapped;

wrapping the sheet about a straight section of the pipe;

lapping the longitudinal edges of the sheet as the wrap is completed; and welding the contacting surfaces of the lapped edges with a fluid cement having therein a solvent of the said resin whereby to effect substantially hermetic seal of the insulation within the sheath.

2. In the method defined in claim 1, including the step of wrapping additional sheets about the straight reach of the insulated pipe to ensheath the reach, including the steps of wrapping and welding a second sheet upon the insulated pipe adjacent to the first aforesaid wrapped sheet; lapping an end of the said second wrapped sheet over the end of the first said wrapped sheet and welding the lapped ends with said cement.

3. In the method defined in claim 1, wherein a wrapped sheet terminates adjacent to a fitting of the insulated pipe, at the end of the aforesaid straight section, and placing a fitting cover of the same resin as the aforesaid sheets adaptable to embrace the said fitting, including the steps of welding the fitting cover to the end of the sheet.

4. In the method defined in claim 3, wherein said fitting cover comprises left-hand and right-hand drawn sections of a smooth-surface, impermeable resin having a thickness in the approximate range of 0.030 to 0.060 inch and having the strength-toughness characteristics of high-impact polystyrene, said right-hand and left-hand sections being drawn to embrace each side of the insulated pipe fitting, each section being drawn to encompass an arc exceeding 180 degrees, whereby to permit opposing edges of left-hand and right-hand sections to overlap.

5. In the method defined in claim 4, wherein the fitting is a T.

6. In the method defined in claim 4, wherein the fitting is a Y.

7. In the method defined in claim 4, wherein the fitting is an elbow.

References Cited

UNITED STATES PATENTS

| | | | |
|---|---|---|---|
| 2,148,884 | 2/1939 | Walter | 156—218 |
| 2,384,547 | 9/1945 | Fryling | 138—145 |
| 2,756,172 | 7/1956 | Kidd | 138—151X |
| 2,980,568 | 4/1961 | Kazmierowicz | 138—151X |
| 3,187,778 | 6/1965 | Peyton et al. | 138—143 |
| 3,213,890 | 10/1965 | Battersby et al. | 138—151 |
| 3,153,546 | 10/1964 | Dunn | 138—162 |

SAMUEL W. ENGLE, Primary Examiner

U.S. Cl. X.R.

138—151, 161

REEXAMINATION CERTIFICATE (173rd)

United States Patent [19]

Helling

[11] B1 3,560,287

[45] Certificate Issued Mar. 20, 1984

[54] METHOD AND APPARATUS FOR PROTECTING INSULATED PIPE

[75] Inventor: Robert W. Helling, Greeley, Colo.

[73] Assignee: Ceel-Co., Lakewood, Colo.

Reexamination Request:
No. 90/000,130, Dec. 24, 1981

Reexamination Certificate for:
Patent No.: 3,560,287
Issued: Feb. 2, 1971
Appl. No.: 634,347
Filed: Apr. 27, 1967

[51] Int. Cl.$^3$ .............................................. B29D 23/10
[52] U.S. Cl. ..................................... 156/218; 138/151; 138/161

[58] Field of Search ..................... 138/149; 285/13; 156/215, 213, 217

[56] References Cited

U.S. PATENT DOCUMENTS

| | | | |
|---|---|---|---|
| 2,110,565 | 3/1938 | Yeager | 156/215 |
| 3,153,546 | 10/1964 | Dunn | 285/13 |
| 3,321,924 | 5/1967 | Liddell | 405/216 |
| 3,495,629 | 2/1970 | Botsolas | 138/149 |

*Primary Examiner*—Jerome W. Massie

[57] ABSTRACT

A method for ensheating an insulated pipe with a rectangular smooth-surfaced, resin sheet having the characteristics of high-impact polystyrene with a thickness in the range of 0.030 to 0.060 inch by welding the overlapping edges with a fluid cement having therein a solvent of the resin. The sheet is permanently curled to a radius which will snugly embrace a range of sizes of pipe insulation and wrapped about the pipe so as to lap the longitudinal edges of the sheet as the wrap is completed.

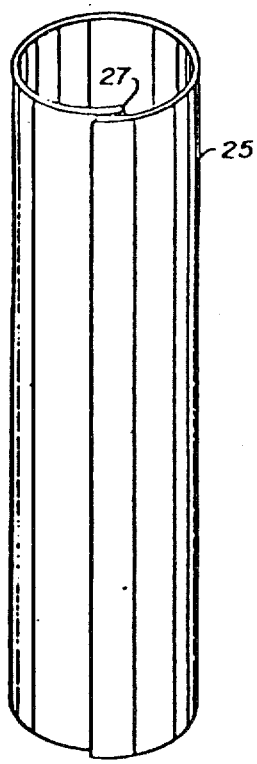

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

Claims 1-7, having been finally determined to be unpatentable, are cancelled.

* * * * *